(12) United States Patent
Kwak et al.

(10) Patent No.: US 6,509,940 B2
(45) Date of Patent: Jan. 21, 2003

(54) LIQUID CRYSTAL DISPLAY AND FABRICATING METHOD THEREOF

(75) Inventors: Dong Yeung Kwak, Daeku-shi (KR); Soon Sung Yoo, Kyungsangbuk-do (KR); Yu Ho Jung, Kyungsangbuk-do (KR); Hu Sung Kim, Seoul (KR); Dug Jin Park, Daeku-shi (KR); Yong Wan Kim, Kyungsangbuk-do (KR); Woo Chae Lee, Kyungsangbuk-do (KR); Byung Chul Ahn, Kyungsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 188 days.

(21) Appl. No.: 09/739,824

(22) Filed: Dec. 20, 2000

(65) Prior Publication Data

US 2001/0022633 A1 Sep. 20, 2001

(30) Foreign Application Priority Data

Dec. 31, 1999 (KR) .......................................... 99-68056

(51) Int. Cl.$^7$ .......................... G02F 1/136; H01L 29/04
(52) U.S. Cl. .............................. 349/43; 349/42; 257/59; 257/72
(58) Field of Search .............................. 349/42, 43, 44; 257/59, 72

(56) References Cited

U.S. PATENT DOCUMENTS 5,949,507 A * 9/1999 Shimada et al. ............ 349/113
6,207,970 B1 * 3/2001 Kim ............................ 257/59
6,310,669 B1 * 10/2001 Kobayashi et al. ........... 349/43

* cited by examiner

Primary Examiner—William L. Sikes
Assistant Examiner—Dung Nguyen
(74) Attorney, Agent, or Firm—Birch, Stewart, Kolasch & Birch, LLP

(57) ABSTRACT

A liquid crystal display device and a fabricating method thereof wherein four masks are used so as to reduce a process. In the device, a gate electrode is formed on a transparent substrate. A gate insulating film is formed on the transparent substrate to cover the gate electrode. An active layer is provided at a portion corresponding to the gate electrode on the gate insulating film. Source and drain electrodes are intervened by an ohmic contact layer on the active layer. A contact portion is connected to and extended from a portion of the drain electrode opposed to the source electrode and has an exposed side surface. A passivation layer is formed on the active layer in such a manner to cover the source and drain electrodes, but to expose the side surface of the contact portion. A pixel electrode is formed on the gate insulating film in such a manner to contact the exposed side surface of the contact portion. Accordingly, the contact portion connected to and extended from a portion of the drain electrode opposed to the source electrode or a plurality of comb-shaped contact portions having the exposed side surfaces are formed in such a manner to overlap with the black matrix of the upper plate provided with color filters. Accordingly, the pixel electrode contacts the side surface of the contact portion overlapping with a black matrix of an upper plate to be electrically connected to the drain electrode, so that an aperture ration can be improved.

9 Claims, 8 Drawing Sheets

LIQUID CRYSTAL DISPLAY AND FABRICATING METHOD THEREOF

BACKGROUND OF THE INVENTION

1. Field of the Invention

This invention relates to a liquid crystal display, and more particularly to a liquid crystal display and a fabricating method thereof wherein four masks are used so as to reduce a process.

2. Description of the Related Art

Generally, a liquid crystal display (LCD) includes switching devices consisting of thin film transistors having gate electrodes, a gate insulating film, an active layer, an ohmic contact layer and source and drain electrodes, and a liquid crystal injected between a lower plate provided with pixel electrodes and an upper plate provided with color filters.

FIG. 1 is a plan view showing a structure of a conventional LCD, and FIG. 2 is a section view of the conventional LCD taken along the A—A' line in FIG. 1. Referring to FIG. 1 and FIG. 2, in the conventional LCD, a gate electrode 13 is formed on a transparent substrate 11 from a metal such as aluminum (Al) or copper (Cu) in such a manner to be connected to a gate line 14. A gate insulating film 15 is formed on the transparent substrate 11 to cover the gate electrode 13 and the gate line 14. The gate insulating film is made from silicon nitride or silicon oxide.

An active layer 17 and an ohmic contact layer 19 are provided at a portion corresponding to the gate electrode 13 on the gate insulating film 15. The active layer 17 is formed from amorphous silicon or polycrystalline silicon being not doped with an impurity. The ohmic contact layer 19 is made from amorphous silicon or polycrystalline silicon doped with an n-type or p-type impurity at a high concentration.

Source and drain electrodes 21 and 23 are formed at each side of the active layer 17 on the gate insulating film 15 in such a manner to contact the ohmic contact layer 19. The source and drain electrodes 21 and 23 is made from a metal such as molybdenum (Mo), chrome (Cr), titanium (Ti) or tantalum (Ta), etc., or a molybdenum alloy such as MoW, MoTa or MoNb, etc. The source electrode 21 is connected to a data line 24 while the drain electrode 23 is opposed to the source electrode 21 with having the gate electrode 13 therebetween.

A thin film transistor is constituted by the gate electrode 13, the gate insulating film 15, the active layer 17 and the source and drain electrodes 21 and 23 as described above. A passivation layer 25 is formed on the gate insulating film 15 to cover the thin film transistor. The passivation layer 25 is made from an inorganic insulating material such as silicon nitride or silicon oxide, etc., or an organic insulating material such as acrylic compound, BCB (β-stagged-divinyl-siloxane-benzocyclobutene) or PFCB (perfluorocyclobutane).

A contact hole 27 for exposing the drain electrode 23 is defined at the passivation layer 25. A pixel electrode 29 contacting the drain electrode 23 via the contact hole 27 is formed on the passivation layer 25. The pixel electrode 29 is formed from a transparent conductive material such as indium tin oxide (ITO), tin oxide (TO) or indium zinc oxide (IZO) at an area excluding a portion corresponding to the thin film transistor on the passivation layer 25.

However, the conventional LCD has a problem in that, since a contact hole must be defined so as to connect the drain electrode to the pixel electrode, an aperture ratio is reduced and a process is complicated.

SUMMARY OF THE INVENTION

Accordingly, it is an object of the present invention to provide a liquid crystal display and a fabricating method thereof wherein a drain electrode and a pixel electrode are connected to each other with no contact hole, thereby increasing an aperture ratio.

In order to achieve these and other objects of the invention, a liquid crystal display device according to one aspect of the present invention includes a transparent substrate; a gate electrode formed on the transparent substrate; a gate insulating film formed on the transparent substrate to cover the gate electrode; an active layer provided at a portion corresponding to the gate electrode on the gate insulating film; source and drain electrodes intervened by an ohmic contact layer on the active layer; a contact portion connected to and extended from a portion of the drain electrode opposed to the source electrode and having an exposed side surface; a passivation layer formed on the active layer in such a manner to cover the source and drain electrodes, but to expose the side surface of the contact portion; and a pixel electrode formed on the gate insulating film in such a manner to contact the exposed side surface of the contact portion.

A liquid crystal display device according to another aspect of the present invention includes a transparent substrate; a gate electrode formed on the transparent substrate; a gate insulating film formed on the transparent substrate to cover the gate electrode; an active layer provided at a portion corresponding to the gate electrode on the gate insulating film; source and drain electrodes intervened by an ohmic contact layer on the active layer; at least one of come-shaped contact portion connected to and extended from a portion of the drain electrode opposed to the source electrode and having an exposed side surface; a passivation layer formed on the active layer in such a manner to cover the source and drain electrodes and the upper portion of the contact portion, but to expose the side surface of the contact portion; and a pixel electrode formed on the gate insulating film in such a manner to contact the exposed side surface of the contact portion.

A method of fabricating a liquid crystal display device according to still another aspect of the present invention includes the steps of forming a gate electrode on a transparent substrate; sequentially forming a gate insulating film, an active layer and an ohmic contact layer on the transparent substrate in such a manner to cover the gate electrode; forming a metal thin film on the ohmic contact layer and then patterning the metal thin film to expose the active layer, thereby forming source and drain electrodes; forming a passivation layer covering the source and drain electrodes on the active layer and then patterning the passivation layer and the active layer to expose the gate insulating film and also a portion of the drain electrode opposed to the source electrode and formed to have more than a desired size, thereby providing a contact portion connected to and extended from the drain electrode to have an exposed side surface; and forming a pixel electrode on the gate insulating film in such a manner to contact the side surface of the contact portion.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
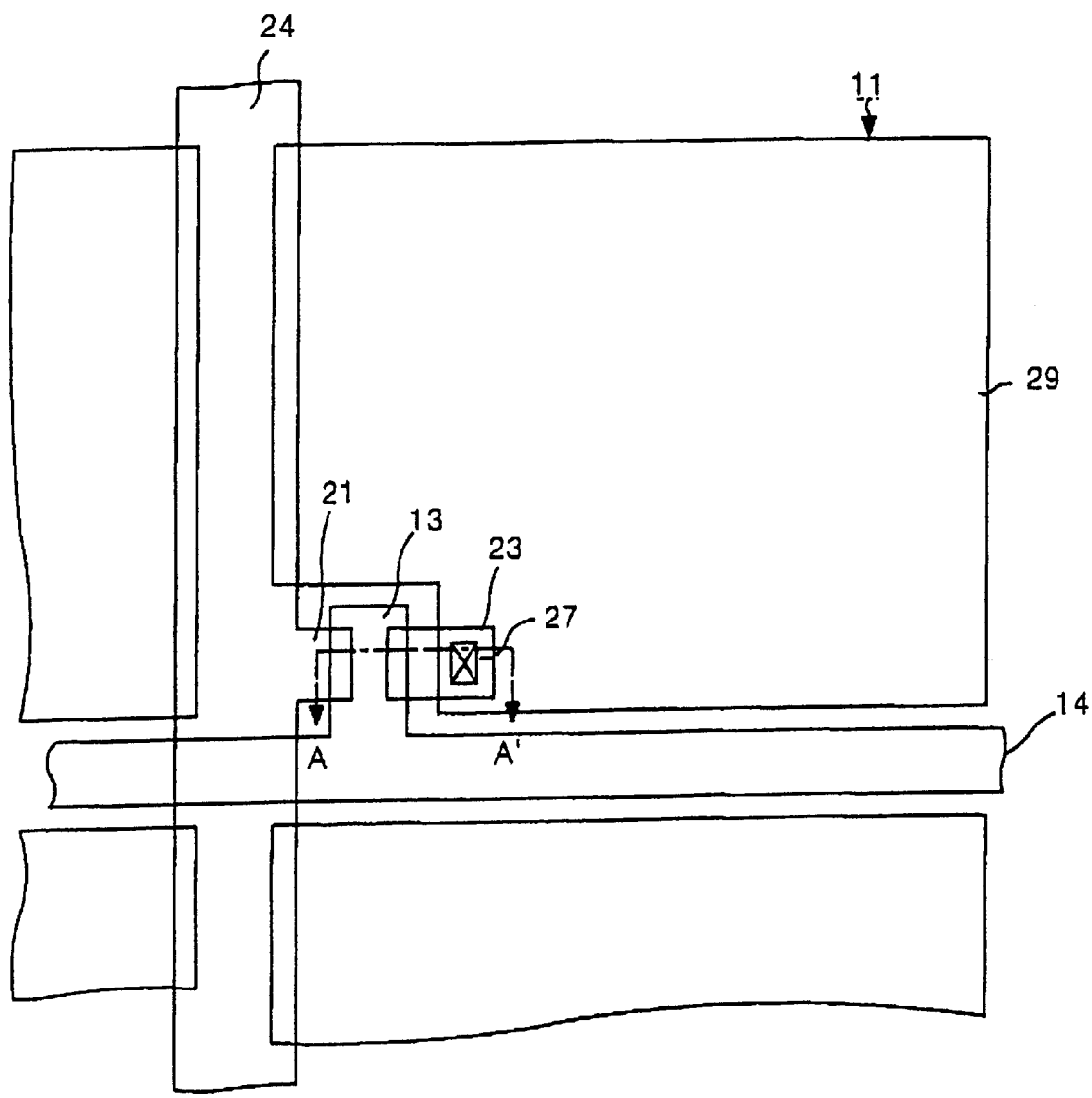
FIG. 1 is a plan view showing a structure of a conventional liquid crystal display device.
Figure 2:
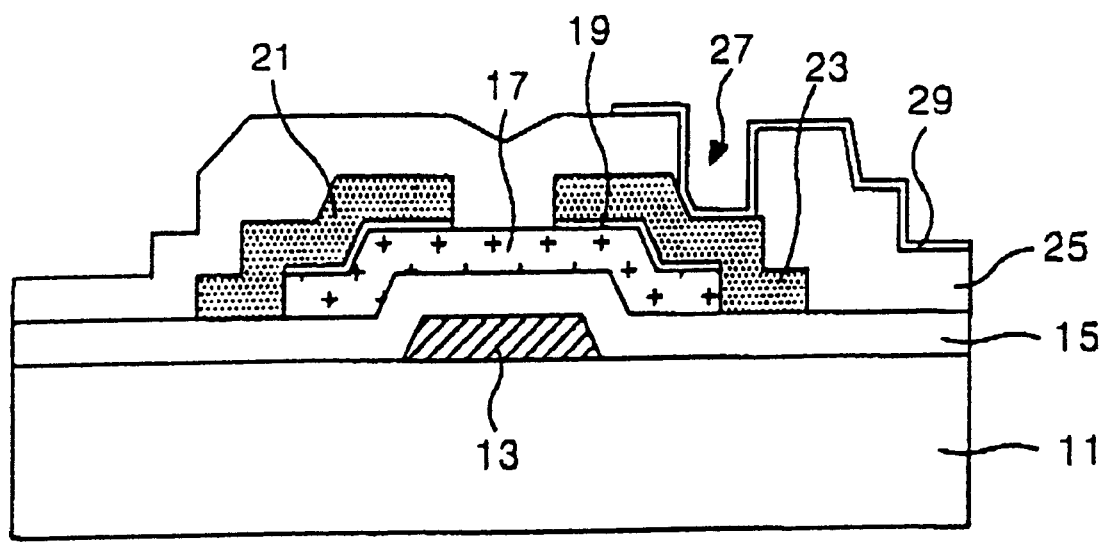
FIG. 2 is a section view of the conventional liquid crystal display device taken along the A–A' line in FIG. 1.
Figure 3:
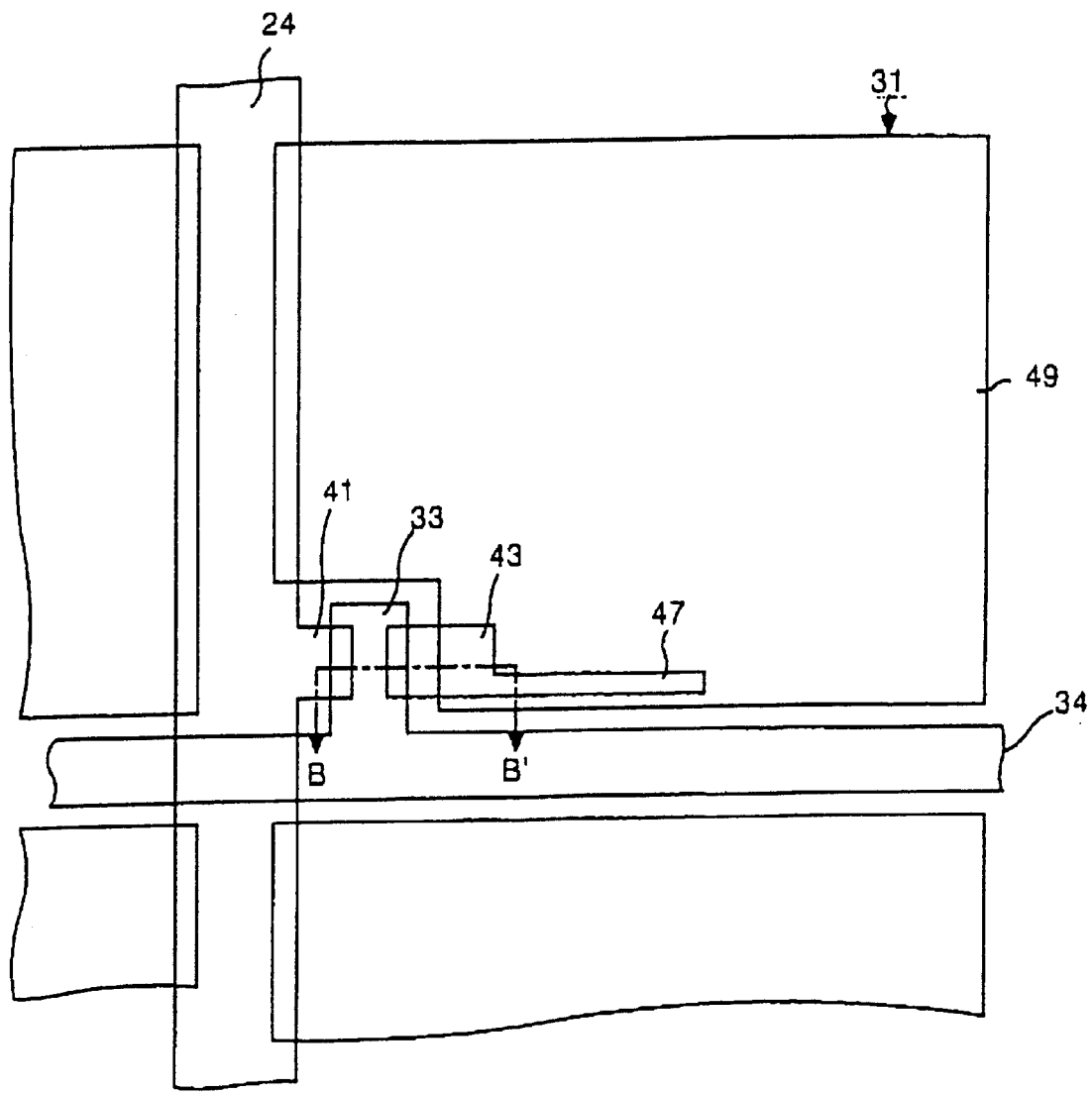
FIG. 3 is a plan view showing a structure of a liquid crystal display device according to an embodiment of the present invention.
Figure 4:
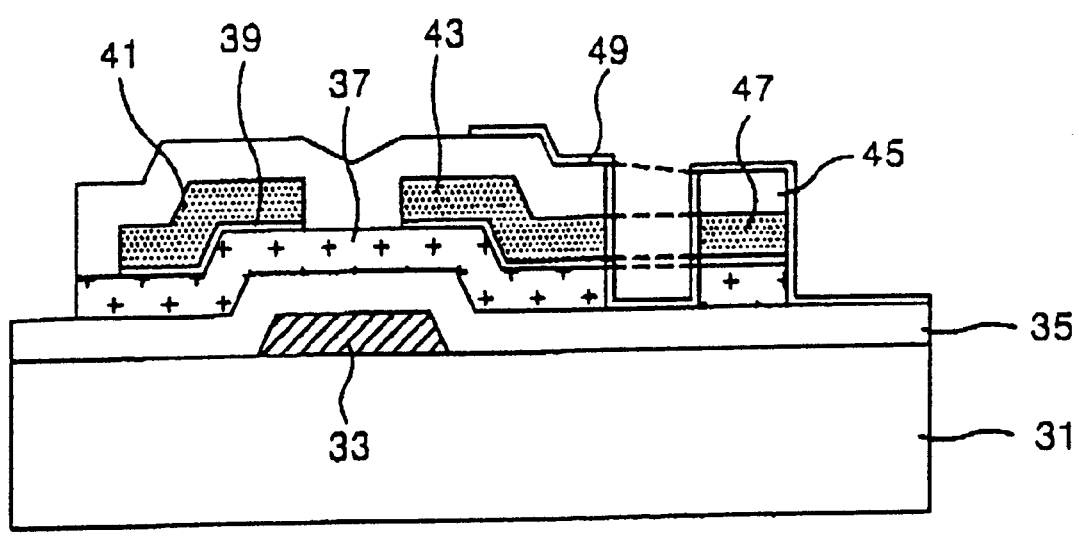
FIG. 4 is a section view of the liquid crystal display device taken along the B–B' line in FIG. 3.

Referring to FIG. 3 and FIG. 4, there is shown a liquid crystal display device according to an embodiment of the present invention. In the liquid crystal display device, a gate electrode 33 is formed on a transparent substrate 31 from a metal such as aluminum (Al) or copper (Cu) in such a manner to be connected to a gate line 34. A gate insulating film 35 is formed on the transparent substrate 31 to cover the gate electrode 33 and the gate line 34. The gate insulating film 35 is made from silicon nitride or silicon oxide.

Amorphous silicon or polycrystalline silicon being not doped with an impurity is deposited onto a portion corresponding to the gate electrode 33 on the gate insulating film 35 to thereby form an active layer 37. Ohmic contact layers 39 are intervened on the active layer 37 to provide source and drain electrodes 41 and 43. The ohmic contact layers 39 are made from amorphous silicon or polycrystalline silicon doped with a n-type or p-type impurity at a high concentration and are spaced from each other at a portion corresponding to the gate electrode 33. The source and drain electrodes 31 and 33 are made from a metal such as molybdenum (Mo), chrome (Cr), titanium (Ti) or tantalum (Ta), etc., or a molybdenum alloy such as MoW, MoTa or MoNb, etc., and are spaced from each other at a portion corresponding to the gate electrode 33. The source electrode 41 is connected to a data line 44 while the drain electrode 43 is opposed to the source electrode 41 with having the gate electrode 43 therebetween. A contact portion 47 connected to and extended from a portion of the drain electrode 43 opposed to the source electrode 41 is provided. The contact portion 47 is formed in such a manner to overlap with the upper plate (not shown) provided with color filters. Under the contact portion 47, the ohmic contact layer 39 and the active layer 37 are left.

A thin film transistor is constituted by the gate electrode 33, the gate insulating film 35, the active layer 37 and the source and drain electrodes 41 and 43 as described above. A passivation layer 45 made from an inorganic insulating material such as silicon nitride or silicon oxide, etc., or an organic insulating material such as acrylic compound, BCB (β-stagged-divinyl-siloxane-benzocyclobutene) or PFCB (perfluorocyclobutane) is formed on the active layer 37 to cover the thin film transistor. The passivation layer 25 is formed in such a manner to cover each side surface of the source and drain electrodes 41 and 43, but to expose the side surface of the contact portion 47.

A pixel electrode 49 made from a transparent conductive material such as indium tin oxide (ITO), tin oxide (TO) or indium zinc oxide (IZO) is provided at an area excluding the gate insulating film and a portion corresponding to the thin film transistor on the passivation layer 45. In this case, the pixel electrode 49 is formed in such a manner to contact the exposed side surface of the contact portion 47. Accordingly, the pixel electrode 49 contacts the side surface of the contact portion 47 without a separate contact hole to be electrically connected to the contact portion 47, so that an aperture ratio can be increased.

Figure 5:
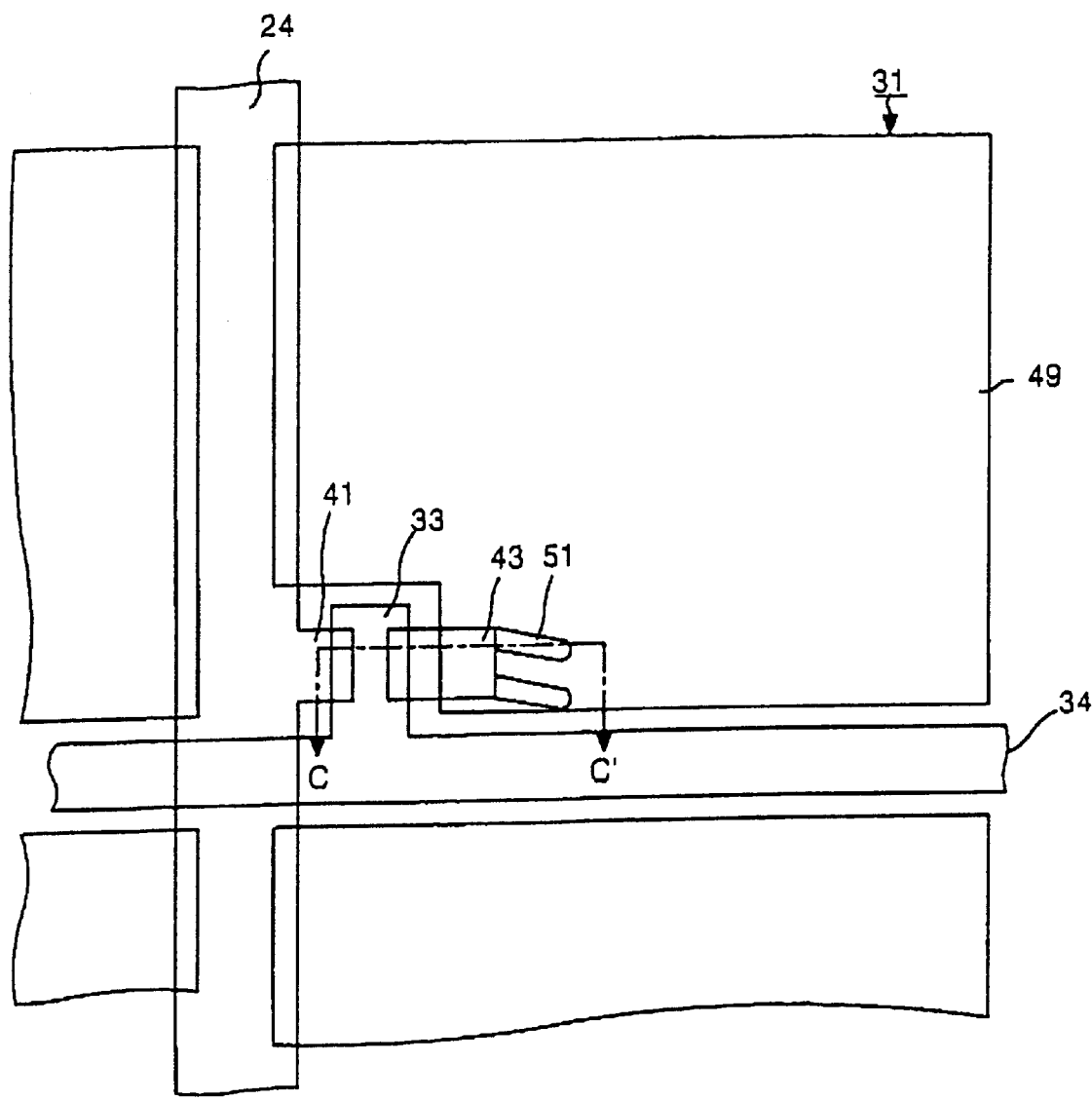
FIG. 5 is a plan view showing a structure of a liquid crystal display device according to another embodiment of the present invention.
Figure 6:
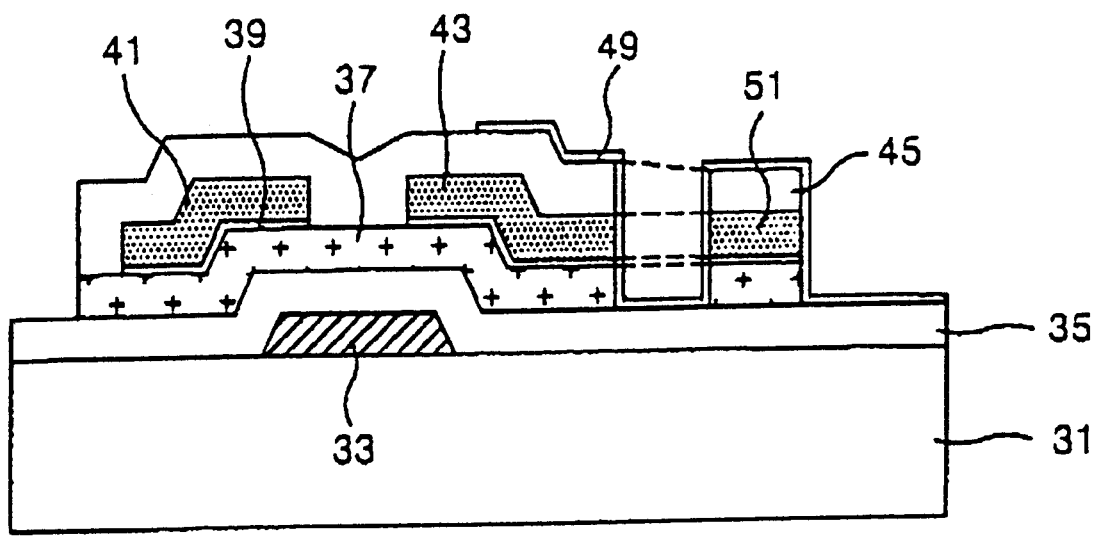
FIG. 6 is a section view of the liquid crystal display device taken along the C–C' line in FIG. 5.

Referring to FIG. 5 and FIG. 6, there is shown a liquid crystal display device according to another embodiment of the present invention. The liquid crystal display device according to another embodiment of the present invention is identical to the liquid crystal display device shown in FIG. 3 and FIG. 4 except for a shape and a location of a contact portion 51.

In the liquid crystal display device according to another embodiment of the present invention, at least one of contact portion 51 with a comb shape is connected to a portion of a drain electrode 43 opposed to a source electrode 41. The plurality of come-shaped contact portions 51 are formed in such a manner to be consistent with the rubbing direction, thereby preventing a light leakage caused by rubbing badness. The contact portion 51 has an exposed side surface to make a side surface contact with a pixel electrode 49.

Figure 7A:
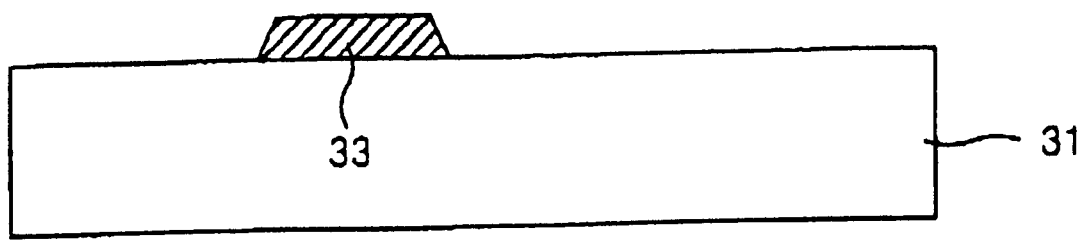
FIG. 7A to FIG. 7D are section views representing a process of fabricating the present liquid crystal display device.

FIGS. 7A to 7D show a process of fabricating the present liquid crystal display device. Referring to FIG. 7A, aluminum (Al) or copper (Cu) is deposited on a transparent substrate 31 by the sputtering technique, etc. or is coated thereon by the electroless plating technique to form a metal thin film. A glass, a quartz or a transparent plastic, etc. may be used as the transparent substrate 31. Then, the metal thin film is patterned by the photolithography including a wet method to form the gate electrode 33.

Figure 7B:
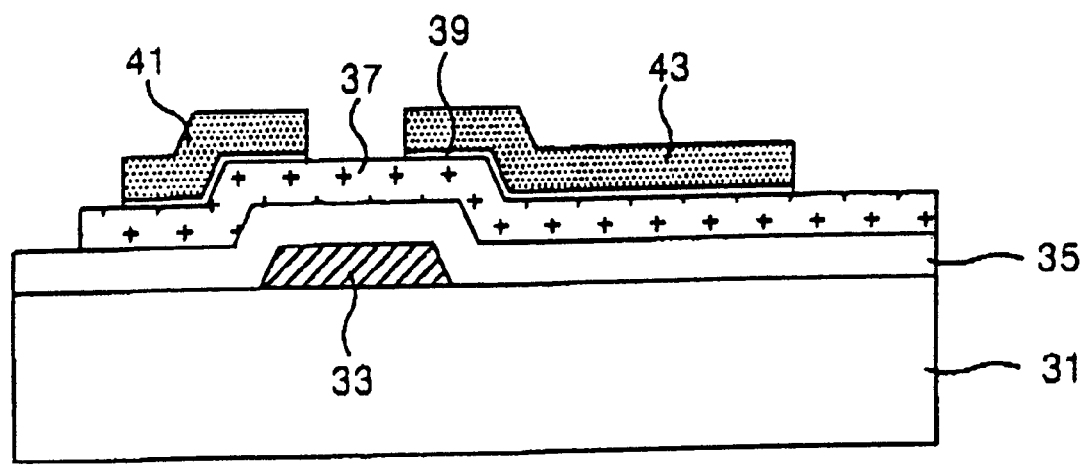

Referring to FIG. 7B, the gate insulating film 35, the active layer 37 and the ohmic contact layer 39 are sequentially formed on the transparent substrate 31 by the chemical vapor deposition (CVD) technique in such a manner to cover the gate electrode 33. The gate insulating film 35 is made from an insulation material such as silicon oxide or silicon nitride, and the active layer 37 is made from amorphous silicon or polycrystalline silicon being not doped with an impurity. The ohmic contact layer 39 is made from amorphous silicon or polycrystalline silicon doped with an n-type or p-type impurity at a high concentration.

A metal such as molybdenum (Mo), chrome (Cr), titanium (Ti) or tantalum (Ta), etc., or a molybdenum alloy such as MoW, MoTa or MoNb, etc. is deposited on the ohmic contact layer 39 by the CVD or sputtering technique to form a metal thin film. Then, the metal thin film is patterned by the photolithography including a wet etching to form the source and drain electrodes 41 and 43. In this case, the drain electrode 41 is formed to have more than a desired size. Thereafter, the exposed ohmic contact layer 39 also is dry-etched to expose the active layer 37. A portion corresponding to the gate electrode 33 between the source and drain electrodes 41 and 43 of the active layer 37 becomes a channel. The source and drain electrodes 41 and 43 make an ohmic contact with the ohmic contact layer 39.

Figure 7C:
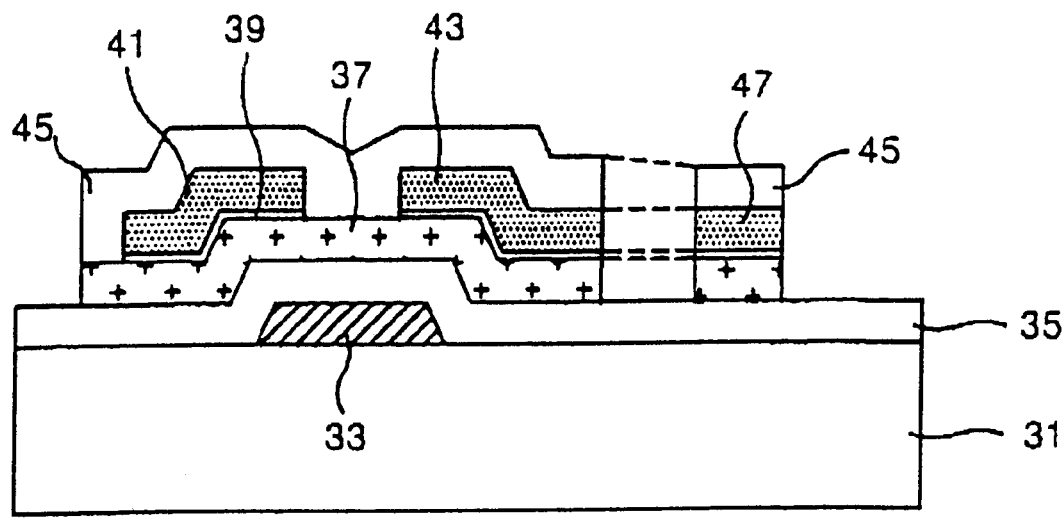

Referring to FIG. 7C, an inorganic insulating material such as silicon oxide or silicon nitride, etc. is deposited on the active layer 39 in such a manner to cover the source and drain electrodes 41 and 43, thereby forming the passivation layer 45. The passivation layer 45 may be formed from an organic insulation material having a small dielectric constant such as acrylic organic compound, BCB or PFCB, etc.

The passivation layer 45 and the active layer 37 are patterned by the photolithography to expose the gate insulating film 35. At this time, a portion of the drain electrode 43 opposed to the source electrode 41 formed into more than the desired size also is patterned to provide the contact portion 47 connected to and extended from the drain electrode 43. In this case, the passivation layer 45 is left at the upper portion of the contact portion 47 while the ohmic contact layer 41 and the active layer 39 are left at the lower portion of the contact portion 47. The side surface of the contact portion 47 is exposed. The contact portion 47 overlaps with a black matrix of the upper plate (not shown) provided with color filters so as to improve an aperture ratio.

Figure 7D:
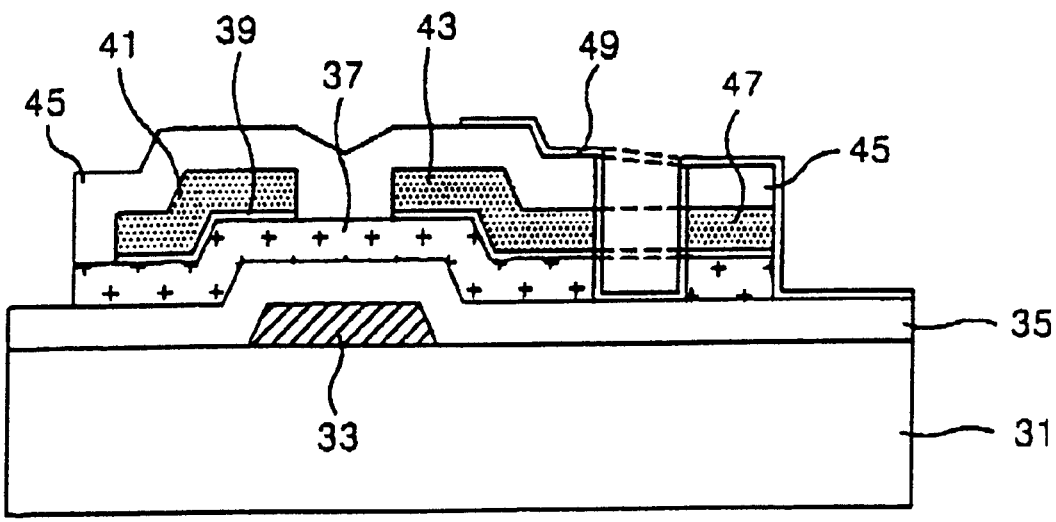

Referring to FIG. 7D, a transparent conductive material such as an indium tin oxide (ITO), a tin oxide (TO) or an indium zinc oxide (IZO), etc. is deposited on the gate insulating film 37 in such a manner to cover the passivation layer 45 and thereafter is patterned by the photolithography including a wet etching, thereby forming the pixel electrode 49. The pixel electrode 49 contacts the side surface of the extended contact portion 47 to be electrically connected to the drain electrode 43.

As described above, according to the present invention, the contact portion connected to and extended from a portion of the drain electrode opposed to the source electrode or a plurality of comb-shaped contact portions having the exposed side surfaces are formed in such a manner to overlap with the black matrix of the upper plate provided with color filters. Also, the pixel electrode contacts the side surface of the contact portion to be electrically connected to the drain electrode. Accordingly, an aperture ration can be improved.

Furthermore, the contact portion is formed in conformity to the rubbing direction, so that a light leakage caused by rubbing badness can be prevented.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device, comprising:

a transparent substrate;

a gate electrode formed on the transparent substrate;

a gate insulating film formed on the transparent substrate to cover the gate electrode;

an active layer provided at a portion corresponding to the gate electrode on the gate insulating film;

source and drain electrodes intervened by an ohmic contact layer on the active layer;

a contact portion connected to and extended from a portion of the drain electrode opposed to the source electrode and having an exposed side surface;

a passivation layer formed on the active layer in such a manner to cover the source and drain electrodes, but to expose the side surface of the contact portion; and a pixel electrode formed on the gate insulating film in such a manner to contact the exposed side surface of the contact portion.

2. The liquid crystal display device according to claim 1, wherein the contact portion is formed to overlap with a black matrix of an upper plate provided with color filters.

3. The liquid crystal display device according to claim 2, wherein the contact portion is formed from the same material as and by the same process as the source and drain electrodes.

4. A liquid crystal display device, comprising:

a transparent substrate;

a gate electrode formed on the transparent substrate;

a gate insulating film formed on the transparent substrate to cover the gate electrode;

an active layer provided at a portion corresponding to the gate electrode on the gate insulating film;

source and drain electrodes intervened by an ohmic contact layer on the active layer;

at least one of come-shaped contact portion connected to and extended from a portion of the drain electrode opposed to the source electrode and having an exposed side surface;

a passivation layer formed on the active layer in such a manner to cover the source and drain electrodes and the upper portion of the contact portion, but to expose the side surface of the contact portion; and a pixel electrode formed on the gate insulating film in such a manner to contact the exposed side surface of the contact portion.

5. The liquid crystal display device according to claim 4, wherein the contact portion is formed in conformity to the rubbing direction.

6. A method of fabricating a liquid crystal display device, comprising the steps of:

forming a gate electrode on a transparent substrate;

sequentially forming a gate insulating film, an active layer and an ohmic contact layer on the transparent substrate in such a manner to cover the gate electrode;

forming a metal thin film on the ohmic contact layer and then patterning the metal thin film to expose the active layer, thereby forming source and drain electrodes;

forming a passivation layer covering the source and drain electrodes on the active layer and then patterning the passivation layer and the active layer to expose the gate insulating film and also a portion of the drain electrode opposed to the source electrode and formed to have more than a desired size, thereby providing a contact portion connected to and extended from the drain electrode to have an exposed side surface; and forming a pixel electrode on the gate insulating film in such a manner to contact the side surface of the contact portion.

7. The method according to claim 6, wherein the drain electrode is formed to have more than the desired size when the metal thin film is patterned to form the source and drain electrodes.

8. The method according to claim 6, wherein the passivation layer and the active layer are patterned to cover the side surfaces of the source and drain electrodes.

9. The method according to claim 6, wherein the contact portion is formed to overlap with a black matrix of an upper plate provided with color filters.

* * * * *